United States Patent [19]
Okutoh

[11] Patent Number: 6,001,497
[45] Date of Patent: Dec. 14, 1999

[54] OVERCHARGE PREVENTING DEVICE

[75] Inventor: Tadashi Okutoh, Kawasaki, Japan

[73] Assignee: Nippon Moli Energy Corporation, Yokohama, Japan

[21] Appl. No.: 09/120,461

[22] Filed: Jul. 26, 1998

[30]     Foreign Application Priority Data

Jul. 23, 1997   [JP]   Japan .................................. 9-197037

[51] Int. Cl.⁶ .................................................. H01M 14/00
[52] U.S. Cl. ................................. 429/7; 429/62; 429/90; 429/61; 320/134; 320/136
[58] Field of Search ................... 429/61, 62, 92, 429/93, 7, 8, 23; 320/134, 136

[56]            References Cited

U.S. PATENT DOCUMENTS 5,252,411   10/1993   Yokokawa et al. ...................... 429/62
5,853,908   12/1998   Okutoh ..................................... 429/7

*Primary Examiner*—Maria Nuzzolillo
*Assistant Examiner*—Angela J. Martin
*Attorney, Agent, or Firm*—Armstrong, Westerman, Hattori, McLeland & Naughton

[57]           ABSTRACT

An overcharge preventing device for a high energy density battery such as a lithium ion battery comprises a voltage sensor means for sensing a voltage of a battery that is being charged, a current feeder means for feeding a current to a heat generating means when a voltage sensed by said voltage sensor means exceeds a preset voltage, and a repeatedly usable thermal actuator means that is thermally coupled to said heat generation means incorporated in a charging current circuit. Upon overcharging of the battery, the thermal actuator means is actuated by heat generated from the heat generating means to interrupt feeding of a charging current to the battery. Upon elimination of an overcharged state, the charging current circuit in the thermal actuator means is resumed to recharge the battery.

4 Claims, 1 Drawing Sheet

OVERCHARGE PREVENTING DEVICE

BACKGROUND OF THE INVENTION

The present invention relates generally to an overcharge preventing device for secondary batteries, and more particularly to an overcharge preventing device for a specific secondary battery of high energy density, e.g., a lithium ion battery using a lithium ion doping or de-doping material as an active negative electrode material.

A lithium ion battery using a lithium ion doping or de-doping carbonaceous material can output high voltage and has high energy density albeit being light in weight, and so is now widely used on portable equipment. Although secondary batteries may be used over and over by charging, yet their performance may become worse upon charging. Especially in the case of a lithium ion battery, various safety devices are incorporated therein so as to prevent overcharging which may otherwise cause an electrolyte leakage due to the actuation of a pressure valve due to gas generation, resulting in thermal runaway, and fuming.

The lithium ion battery is charged in a constant voltage, constant current charging mode to prevent overcharging. Insofar as the charging voltage of a charger is kept constant, overcharging is unlikely to occur.

However, this is not true of the case where the charger fails, or the lithium battery is charged without recourse to a dedicated charger, e.g., using a charger of high charging voltage; the lithium ion battery is overcharged.

To avoid this problem, the inventors have filed Japanese Patent Application No. 286757/1986 to come up with a secondary battery protector comprising a battery voltage sensor and a switch for cutting off a charging current by the voltage sensor, so that upon detection of overcharge, the charging current is cut off to interrupt charging.

The present invention is directed to a protector for a secondary battery having high energy density such as a lithium ion battery using a lithium ion doping or de-doping carbonaceous material as an active negative electrode material. A particular object of the invention is to provide a secondary battery protector which, upon overcharging, is actuated to interrupt charging and, upon elimination of the overcharged state, is actuated to recharge the battery.

SUMMARY OF THE INVENTION

Figure 1:
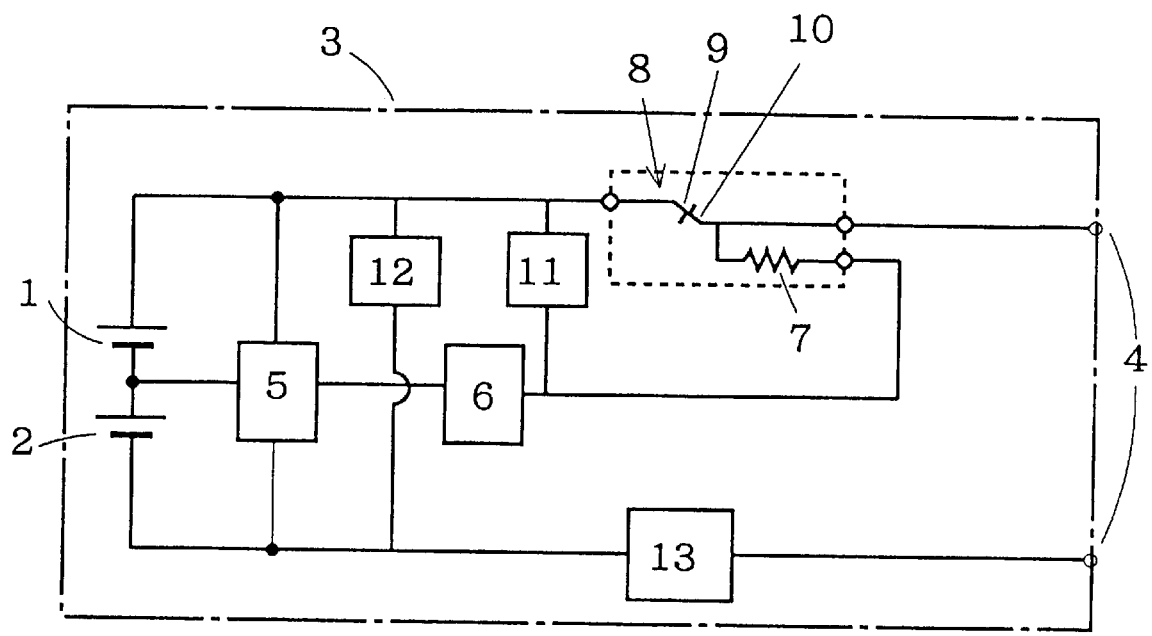
FIG. 1 is illustrative of one embodiment of the overcharging protector according to the invention.

The present invention provides an overcharge preventing device for a secondary battery using a non-aqueous electrolyte, comprising a voltage sensor means for sensing a voltage of a battery that is being charged, a current feeder means for feeding a current to a heat generating means when a voltage sensed by said voltage sensor means exceeds a preset voltage, and a repeatedly usable thermal actuator means that is thermally coupled to said heat generation means incorporated in a charging current circuit, wherein:

upon overcharging of said battery, said thermal actuator means is actuated by heat generated from said heat generating means to interrupt feeding of a charging current to said battery, and upon elimination of an overcharged state, said charging current circuit in said thermal actuator means is resumed to recharge said battery.

Preferably, the thermal actuator comprises a bimetal.

Preferably, the heat generating resistance is fixed to either one of pieces with bimetal contacts provided thereon for electrical connection thereto.

Preferably, the thermal actuator means is located in the vicinity of the secondary battery and is actuated at a temperature lower than a highest temperature at which a separator forming the secondary battery is usable.

DESCRIPTION OF THE PREFERRED EMBODIMENT

With the overcharge preventing device for a secondary battery having high energy density such as a lithium ion battery using a lithium ion doping or de-doping carbonaceous material for a negative electrode, charging is interrupted upon a large temperature increase after the elapse of a given time from an overcharged state. This is because of the provision of the thermal actuator means that can be actuated by the heat generated from the heat generating resistance by a charging current in the overcharged state. The thermal actuator means is resumed upon a temperature drop, so that upon elimination of the overcharged state, it is possible to recharge the battery.

For the thermal actuator means, it is preferable to use a bimetal type of thermal actuator means having an electrical contact designed to open at a temperature higher than a preset temperature, or a thermal actuator means comprising a positive temperature coefficient ceramic resistance element with a resistance value increasing with increasing temperature, or a positive temperature coefficient resistance element formed of synthetic resin and an electrically conductive material.

In the inventive overcharge preventing device that is not designed to detect the overcharged state of the battery by current or voltage alone, the thermal actuator means is actuated by a temperature increase due to the feeding of a current to the heat generating means for a given time or longer, thereby cutting off the charging current. Thus, the present invention can provide an overcharge preventing device that is unlikely to malfunction by reason of a temporary current or voltage fluctuation, and so has high reliability. To protect a secondary battery against overdischarge, the overcharge preventing device of the invention may also be provided with a cutoff means for cutting off a current when the voltage of the battery becomes lower than the final discharge voltage.

The preferred embodiment of the invention is now explained with reference to the accompanying drawings.

FIG. 1 is a diagram that illustrates one embodiment of the overcharge preventing device according to the invention.

More specifically, FIG. 1 shows the overcharge preventing device used with a battery pack 3 including two lithium ion batteries 1 and 2. Input/output terminals 4 of the overcharge preventing device are connected, for charging, to a constant voltage charging source comprising a constant voltage generating circuit, a smoothing circuit, etc., and connected, for discharging, to equipment with which the batteries are used.

During charging, a voltage sensor means 5 monitors the voltages of the lithium ion batteries 1 and 2, so that when the voltage of either one of the batteries exceeds a preset voltage to put the battery in an overcharged state, a current is fed to a heat generating resistance 7 through a heat generating resistance conducting means 6. The heat generating resistance 7 is thermally coupled to a bimetal type of thermal actuator means 8 incorporated in a charging current circuit, and including a fixed piece 9 and a movable piece 10. Preferably, the heat generating resistance, and thermal actuator means have such temperature properties or heat capacity that a contact between the fixed piece 9 and the movable piece 10 is opened within about 10 to 30 seconds after the start of a current supply.

A display means 11 may be provided to display that charging is interrupted by the thermal actuator means actuated upon the battery being overcharged during charging. While the battery remains overcharged, the active material remains still dischargeable even upon the interruption of a charging current supply. The amount of the dischargeable active material varies depending on what state the battery is charged in. In the case of a battery having high energy density such as a lithium ion battery, however, a large amount of energy is built up in the form of the active material. This energy, if it is allowed to stand alone, may lead to risks of spontaneous thermal runaway, internal pressure increases, etc.

To solve such a problem, the overcharge preventing device of the invention is provided with a discharging means 12 comprising a detector means for detecting the operation of the thermal actuator means and a discharging resistance. This detector means is capable of detecting that the thermal actuator means is actuated either upon the detection of overcharge or by the heat generated in the battery or an increase in the surrounding temperature. The discharging means 12 discharges the energy built up in the battery to bring the battery back to a safe state.

The overcharge preventing device of the invention may also be provided with an over-discharge protector means 13 that is actuated to interrupt discharge when the battery voltage sensor means senses that the voltage of either one of the batteries becomes lower than the final discharge voltage. The over-discharge protector means may be constructed of a switching element comprising a field effect transistor that can cut off a current when the voltage sensed becomes lower than the preset value, or the like.

In addition, the overcharge preventing device of the invention may be provided with an overcurrent protecting means that can cut off a current when an overcurrent flows longer than required during the discharge of the battery. In this regard, it is to be noted that the overcurrent protecting switch element may also be used as the over-discharge protecting means, if a voltage drop across a current cutoff switching element during a current supply is detected by an overcurrent detector means to cut off the current cutoff switching element. This makes it unnecessary to incorporate two switching elements for overcharge, and overcurrent protecting purposes, and so can reduce a voltage drop due to the switching elements, which becomes large when large currents are fed from lithium ion batteries to equipment with which they are used. It is thus possible to use batteries as large current sources.

Figure 2:
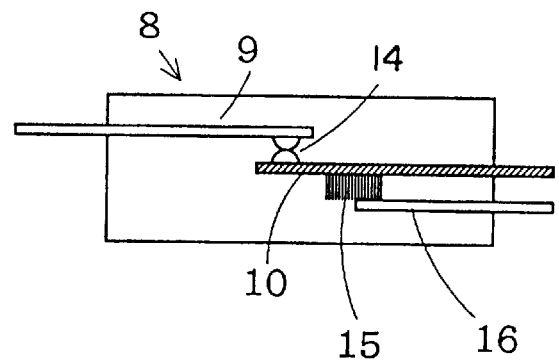
FIG. 2 is illustrative of one embodiment of a thermal actuator means according to the invention.

FIG. 2 is a sectional schematic illustrative of one embodiment of the thermal actuator means according to the invention.

A contact 14 between the fixed and movable pieces 9 and 10 in the thermal actuator means 8 is closed to form a current supply circuit in a normal charging state. The movable piece 10 is constructed of a bimetal prepared by joining together metals having different coefficients of thermal expansion. A heat generator 15 is located between the movable piece 10 and a heating current supply piece 16 for heating the heat generator, and electrically connected to the latter. For the heat generator, a sheet form of metal resistance unlikely to be fused down even upon repeated use is preferably employed. By making the heat generator integral with the thermally operating piece, it is thus possible to make an adequate thermal coupling between the heat generator and the thermal actuator means, and so disconnect the contact precisely in an unusual state.

The overcharge preventing device of the invention uses a resumable means such as a bimetal type of thermal actuator means as the current cutoff means during overcharging, and so is unlikely to malfunction, e.g., cut off the current, for instance, when the voltage becomes abnormal momentarily. After the overcharged state vanishes, it is then possible to recharge the battery.

Preferably, the thermal actuator means is located in the vicinity of the batteries, and is operable at a temperature lower than the highest temperature at which a separator forming the battery is usable. This enables the charging current to be cut off by an increase in the battery temperature even when the temperature by the heat generating resistance does not exceed a given temperature. For a lithium ion battery, a separator formed of micro-porous polyethylene or polypropylene is typically used. Such a separator softens at high temperatures, and so fails to perform its own function. In addition, the active positive electrode material reacts with the active negative electrode material, resulting in a possible risk of thermal runaway, etc. due to an internal pressure increase. The upper limit on the temperature at which usually available polyethylene separators are usable is about 110° C. From this perspective, a thermal actuator means operable at a temperature lower than about 110° C. is thus preferably used.

According to the present invention, the overcharge preventing device for secondary batteries is provided with a thermal actuator means that is actuated by the heat generated from a heat generating resistance in an overcharged state, and is repeatedly operable. It is thus possible to interrupt the charging of a battery after the elapse of a given time in the overcharged state, and recharge the battery after the overcharged state vanishes.

What I claim is:

1. An overcharge preventing device for a secondary battery, comprising a voltage sensor means for sensing a voltage of a battery that is being charged, a current feeder means for feeding a current to a heat generating means when a voltage sensed by said voltage sensor means exceeds a preset voltage, and a repeatedly usable thermal actuator means that is thermally coupled to said heat generation means incorporated in a charging current circuit, wherein:

upon overcharging of said battery, said thermal actuator means is actuated by heat generated from said heat generating means to interrupt feeding of a charging current to said battery, and upon elimination of an overcharged state, said charging current circuit in said thermal actuator means is resumed to recharge said battery.

2. The overcharge preventing device according to claim 1, wherein said thermal actuator comprises a bimetal.

3. The overcharge preventing device according to claim 2, wherein said heat generating resistance is fixed to either one of pieces with bimetal contacts provided thereon for electrical connection thereto.

4. The overcharge preventing device according to claim 1, wherein said thermal actuator means is located in the vicinity of said secondary battery and is actuated at a temperature lower than a highest temperature at which a separator forming said secondary battery is usable.

* * * * *